United States Patent
Rosenberg

(10) Patent No.: US 7,237,114 B1
(45) Date of Patent: Jun. 26, 2007

(54) METHOD AND SYSTEM FOR SIGNING AND AUTHENTICATING ELECTRONIC DOCUMENTS

(75) Inventor: Greg Rosenberg, Atlanta, GA (US)

(73) Assignee: ProNVest, Inc., Atlanta, GA (US)

( * ) Notice: Subject to any disclaimer, the term of this patent is extended or adjusted under 35 U.S.C. 154(b) by 0 days.

(21) Appl. No.: 09/559,414

(22) Filed: Apr. 26, 2000

(51) Int. Cl.
*H04L 9/00* (2006.01)

(52) U.S. Cl. .................. 713/176; 713/161; 713/170; 713/176; 713/189; 713/193; 705/75; 705/67

(58) Field of Classification Search ............. 713/155; 380/279
See application file for complete search history.

(56) References Cited

U.S. PATENT DOCUMENTS

| | | | | |
|---|---|---|---|---|
| 5,208,858 A | * | 5/1993 | Vollert et al. ................. | 380/43 |
| 5,534,855 A | | 7/1996 | Shockley et al. ......... | 340/825.3 |
| 5,535,276 A | * | 7/1996 | Ganesan ..................... | 713/155 |
| 5,544,255 A | | 8/1996 | Smithies et al. ............ | 382/119 |
| 5,606,609 A | | 2/1997 | Houser et al. ................ | 380/4 |
| 5,615,268 A | * | 3/1997 | Bisbee et al. ............... | 713/176 |
| 5,737,419 A | * | 4/1998 | Ganesan ..................... | 713/169 |
| 5,748,738 A | | 5/1998 | Bisbee et al. ................ | 380/25 |
| 5,818,955 A | | 10/1998 | Smithies et al. ............ | 382/232 |
| 5,872,848 A | | 2/1999 | Romney et al. .............. | 380/25 |
| 5,898,156 A | | 4/1999 | Wilfong .................... | 235/380 |
| 5,926,552 A | | 7/1999 | McKeon ..................... | 380/51 |
| 5,933,498 A | | 8/1999 | Schneck et al. ............... | 380/4 |
| 5,940,187 A | | 8/1999 | Berke ........................ | 358/434 |
| 5,943,423 A | | 8/1999 | Muftic ........................ | 380/25 |
| 5,949,876 A | | 9/1999 | Ginter et al. .................. | 380/4 |
| 5,963,649 A | | 10/1999 | Sako ........................... | 380/25 |
| 5,966,445 A | | 10/1999 | Park et al. ..................... | 380/25 |
| 5,970,143 A | | 10/1999 | Schneier et al. ............. | 380/23 |
| 5,982,506 A | | 11/1999 | Kara ......................... | 358/405 |
| 6,009,177 A | | 12/1999 | Sudia .......................... | 380/25 |
| 6,023,509 A | | 2/2000 | Herbert et al. ............... | 380/25 |
| 6,026,163 A | | 2/2000 | Micali .......................... | 380/9 |
| 6,219,423 B1 | * | 4/2001 | Davis ......................... | 380/268 |
| 6,351,634 B1 | * | 2/2002 | Shin ........................... | 455/410 |
| 6,401,206 B1 | * | 6/2002 | Khan et al. ................. | 713/176 |

(Continued)

OTHER PUBLICATIONS

Cocks, Clifford, Split-Key Cryptographic System and Method, PCT WO 99/05818.*

(Continued)

*Primary Examiner*—Syed A. Zia
(74) *Attorney, Agent, or Firm*—Stephen J. Stark; Miller & Martin PLLC

(57) ABSTRACT

A system and method for signing, sorting, and authenticating electronic documents using public key cryptography. The system comprises a document service computer cluster connected to user computers, document owner server computers, and registration computers via a network such as for example, the internet or the world wide web. Document owners and system users can store electronic documents in an encrypted database located on the document service computer cluster, or on a document safe connected to the document owner server. Users can sign documents by identifying the document to be signed and sending a signing request to the document service computer cluster. The document service computer cluster retrieves the user's private key, which is located securely in a database on the cluster, and signs the identified document. No dedicated signing software need be installed on the user computer prior to accessing the document service computer cluster.

22 Claims, 10 Drawing Sheets

U.S. PATENT DOCUMENTS 6,453,416 B1 * 9/2002 Epstein ........................ 713/170
6,963,971 B1 * 11/2005 Bush et al. .................. 713/153

OTHER PUBLICATIONS

Web Page http://csrc.nist.gov/nistbul/cs196-08.txt "Implementation Issues for Cryptography", pp. 1-7, printed Jul. 26, 2000.

Web Page http://www.garlic.com/~lynn/aadswp.htm "Account Authority Digital Signatures: *Enabling Secure Internet Transactions via Existing Payment Processes & Infrastructure*", pp. 1-14, printed Mar. 2, 2000.

Web page http://www.econ.vu.nl/vakgroep/bik/studenten/groep09/securi~1.htm "Securing Communications on the Intranet and Over the Internet", pp. 1-25, printed Mar. 24, 2000.

Web page http://www.hrl.il.ibm.com/sign/paper.html "*Surf'N 'Sign*: Client Signatures on Web Documents", pp. 1-12, printed Feb. 17, 2000.

Web page http://keywareusa.com/600_news/press_releases/pr24.html "Keyware Technologies and Belsign Integrate Biometrics and Digital Certificates Significant Step Forward in the Area of Security for the Exchange of Digital Information", pp. 1-2, printed Feb. 17, 2000.

Web page http://www.digsigtrust.com/pdsb.html "Digital Signatures and Public", pp. 1-7, printed Feb. 17, 2000.

Web page http://www.law.warwick.ac.uk/jilt/98-3/ford.html Identity Authentication and 'E-Commerce', pp. 1-17, printed Feb. 1700.

Web page http://www.abanet.org/scitech/ec/isc/dsg-tutorial.html "*Digital Signature Guidelines Tutorial*", pp. 1-10, printed Feb. 23, 2000.

Web page http://www.tandem.com/prod_des/tcssdrpd/tcssdrpd.htm "iTP Certificate Directory", pp. 1-2, printed Feb. 17, 2000.

Web page http://www.cybersign.com/techoverview.htm "Technology Overview", pp. 1-3, printed Feb. 17, 2000.

Web page http://www.silanis.com/electron.htm "The Essentials of Electronic Approval", pp. 1-4, printed Feb. 23, 2000.

Web page http://www.penop.com/penop/penop.nsf/htm.../intellectual_property_notice.htm "Intellectual Property Notice", pp. 1-2, printed Feb. 23, 2000.

Web page http://www.penop.com/penop/penop.nsf/htmlmedia/how_penop_works.html "What is PenOp", pp. 1-5, printed Feb. 23, 2000.

Web page http://www.xcert.com/corp/our_tecnology.html "Our Technology" pp. 1-2, printed Feb. 23, 2000.

Web page http://www.xcert.com/software/sentryra.html "Sentry RA", pp. 1-4, printed Feb. 23, 2000.

Web page http://www.xcert.com/software/sentryca.html "Sentry CA", pp. 1-6, printed Feb. 23, 2000.

* cited by examiner

METHOD AND SYSTEM FOR SIGNING AND AUTHENTICATING ELECTRONIC DOCUMENTS

FIELD OF THE INVENTION

This invention relates to a system and method for signing, storing, and authenticating electronic documents.

BACKGROUND OF THE INVENTION

Commerce on the internet is hindered by the inconvenience of creating, viewing, and signing agreements and contracts over the world wide web ("the web"). Many agreements and contracts are too large or too complex to be executed on the web using more commonly used methods such as, for example, exchanging credit card information between parties to a contract. These contracts can include multiple clauses, or may require that parties extensively modify standard contract forms by entering information into the forms and defining the scope of the executed contract. Certain clauses may need to be initialed signifying that each party has read and agrees to the initialed clause. Also, there can be several parties to a contract, requiring all parties to sign the contract document.

Technology for signing and authenticating electronic documents is available. One technology is public key cryptography. Using this technology, a prospective signer obtains a public key and an associated private key. A document encrypted with a signer's public key is relatively difficult to decrypt without knowledge of the associated private key. Decrypting an encrypted document or a digital signature with a signer's public key verifies, with a degree of certainty, that the document or signature was encrypted by a person having access to the associated private key. A digital signature can be created by encrypting a one way hash of a document with a private key. The hash is a condensed and unique form of the document, and any changes to the document after signing results in an altered hash. Thus, the digital signature is unique to the document and to the signer's private key. A recipient of the digitally signed document can verify that the document was signed by a particular person, and that the document was unaltered after signing, by decrypting the digital signature using the signer's public key, and confirming that the resulting decrypted hash is identical to a newly produced hash of the received document. Typically, public keys are used to encrypt message or to verify signed documents, and private key are kept secret, and are used to decrypt messages or to sign document.

The recipient of the signed document can authenticate the digital signature by having a trusted third party independently confirm the identity of the person owning the private/public key pair. Certificates are instrumental in authentication. The signer's certificate is a document that is encrypted using a trusted third party's private key, that identifies the owner of the public key, and that contains the signer's public key. The certificate confirms that the trusted third party knows the owner of the attached public key to be the person listed in the certificate. The trusted third party can be a certification authority. To authenticate the signature, the recipient decrypts the certificate using the certification authority's widely available and trusted public key, and uses the enclosed signer's public key to verify the signature appended to the originally received document.

However, methods currently available for deploying this technology are cumbersome to use. For example, an individual browsing the web using a commonly available browser such as Netscape Navigator or Internet Explorer might want to enter into a contract with a supplier on the web. The individual goes to the supplier's web site and views a sample contract. To sign the contract, the individual downloads the document and opens encryption enabled program capable of reading, amending and signing the downloaded document. The encryption enabled program must be installed on the individual's computer in addition to the browser. After adding relevant information to the document, the individual digitally signs the document using a private key that must be securely kept by the individual. The individual then emails the document to the supplier. On receiving the digitally signed document, the supplier must verify the digital signature using the individual's public key, and authenticate the individual's certificate using a trusted certification authority's public key.

This method of transacting business over the web has not been widely adopted. Many web users are unfamiliar with the intricacies of digitally signing documents, and are therefore reluctant to familiarize themselves with the technology and to purchase the necessary hardware and software required to use these methods. Transacting parties frequently resort to completing transactions by executing contracts on paper.

In addition to the inconvenience of current digital signing methods, widespread use of public key cryptography can be problematic for security reasons. With current technology, each signer must maintain the confidentiality of his or her private key. The security of current digital signing methods depends on how securely signers keep their private keys. Frequently, signers are unfamiliar with computer technology and potential threats to the confidentiality of their private keys. Private keys may be stored unsecured or weakly secured in a signer's computer and may be vulnerable to hacking. Businesses having customers with a broad range of computing sophistication may be reluctant to transact business with customers using these digital signing and authenticating methods in light of the described drawbacks.

Therefore, a need exists for a more secure and convenient method of digitally signing and authenticating electronic documents on the web.

SUMMARY OF THE INVENTION

The present invention provides a system and method for signing and authenticating electronic documents using, for example, public key cryptography. The method includes centrally maintaining a database containing at least portions of private encryption keys which are associated with users of the document signing and authenticating system. The private encryption key portions can be used by the system, together with non-public information received from users, for temporarily constructing or reconstructing complete private encryption keys that can be used for signing, encrypting, and decrypting. The complete keys can be destroyed immediately after use so that the system stores insufficient information to sign, encrypt or decrypt documents. Alternatively, if complete private keys are stored in the database, complete private encryption key constructing and reconstructing can be avoided. The database can be secured by encrypting its contents and by restricting access to the database contents to system users who have shown appropriate authorization. For example, the system may require a database decryption key to decrypt contents of the database. The database decryption key can be temporarily constructed with user provided information, used for decrypting, and then subsequently destroyed. The database can be located on a local computer cluster.

The local computer cluster includes one or more computers that can be interconnected, for example, via a secure local area network. Computers within the local cluster are known to operators of the local area network and are more trusted than remote computers. Access to computers in the local cluster is tightly controlled. The local cluster can be connected to remote computers via a network such as, for example the internet or the web, to which unknown and presumably unfriendly computers can have access.

The method also includes receiving at the local computer cluster a signing request transmitted from a first remote computer by a first user, identifying the signing request as having being transmitted by the first user, and identifying a signature ready document to be signed. The signing request can be initiated by, for example, the first user clicking on an icon at a signing line within the displayed signature ready document that contains an embedded uniform resource locator ("URL"). The signing request can be transmitted, for example, by the first user accessing the web using a commercially available web browser running on the first remote computer, locating the local computer cluster web site, transmitting user identification information, passwords, or other non-public information to the local computer cluster using the browser, and identifying the document to be signed. The transmitted non-public information can be referred to as signing identification credentials. The browser can communicate with the local computer cluster using, for example, hypertext transport protocol ("HTTP").

The method additionally includes retrieving at the local computer cluster a private key portion associated with the first user from the private key database, retrieving the signature ready document to be signed, and signing the signature ready document on the local computer cluster using a complete private key generated from the first users private key portion in response to the signing request. The signature ready document can be retrieved at the local computer cluster from the user computer, from other remote computers connected to the local computer cluster, or from the local computer cluster itself. Additionally, retrieval can be automatic, so that the signature ready document can be retrieved merely by the user clicking a signing request icon within a browser running on the user computer. If the private key portion is a complete signing key, a generating step can be avoided.

The document signing and authentication system of the present invention includes a local computer cluster, also referred to as a document service cluster. The local computer cluster can be connected to at least one first remote computer which can be a user computer. The local computer cluster can also be connected to a second remote computer which can be a document server operated by the document owner and also to a second remote computer which can be a document safe. Individuals can register as users of the signing and authentication system of the present invention by registering at a registration center. A registration center includes a registration computer which can be connected to the document service cluster via a computer network including the internet, or via a dial-up link.

DETAILED DESCRIPTION OF THE INVENTION

Figure 1:
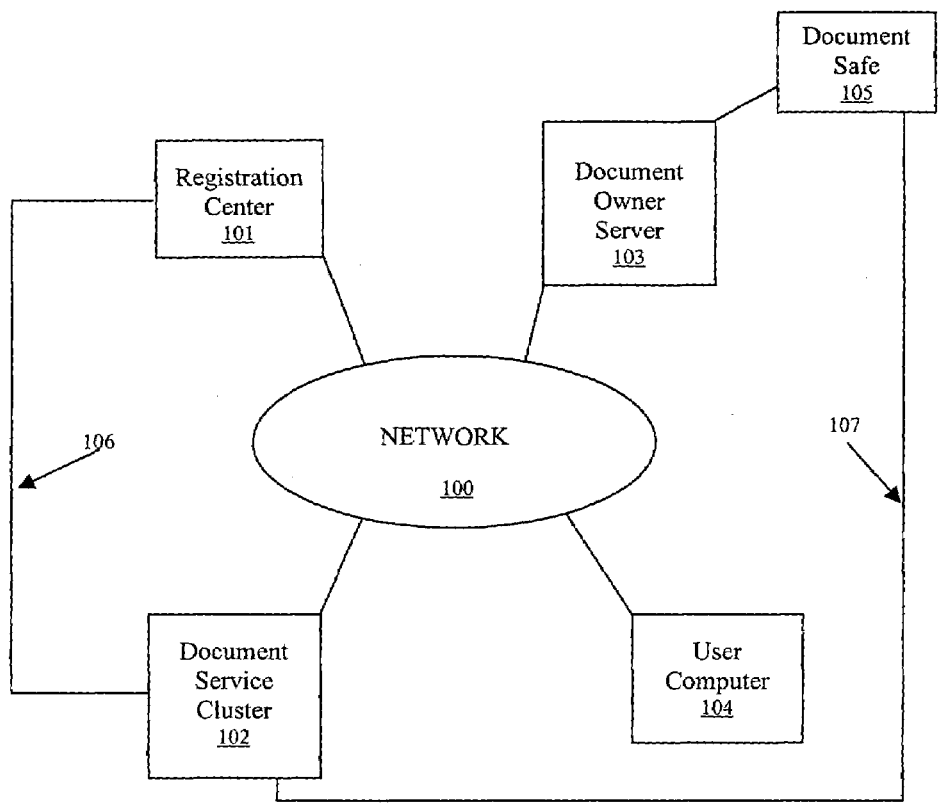
FIG. 1 is a diagram of an embodiment of the signing and authentication system of the present invention.

The present invention provides a system and method of signing electronic documents and for authenticating signed documents. The system is shown in FIG. 1. The system comprises several components including a registration center 101, a document owner server 103, at least one network appliance such as, for example a user computer 104, and a document service cluster 102. These components are connected to each other and can communicate via a network 100, such as the internet or the web. In addition, a document safe 105 can be connected to or contained within the document owner server 103. Additionally, the document safe 105 can be connected to the document service cluster 102 via a dedicated connection such as, for example, a direct dial connection 107. Also, the registration center 101 can be connected to the document service cluster 102 via a dedicated connection such as, for example, a direct dial connection 106.

The document service cluster 102, document safe 105 and registration center 101 can be maintained by a document service provider. Individuals can access the system via a network appliance including, for example, a user computer 104 connected to the network 100. Document owners can maintain document owner servers 103.

This invention allows users to view, modify, and sign documents made available to them over the internet by a document owner. In one embodiment of the invention, a user accesses and signs the documents via a user computer 104 running a commercially available web browser such as, for example, Netscape Navigator 4.6 or Microsoft Internet Explorer version 5.0. The user computer 104 does not need to run dedicated software such as an add-in program, to enable a user to access and sign documents.

Typically, a document owner prepares electronic documents for subsequent signing by users, and can store these signature ready documents in locations including the document safe 105, the document owner server 103, or on the document service cluster 102. Users can prepare their own signature ready documents and, for example, store the documents similarly to document owners. Signature ready documents can be prepared in a standard generalized markup language ("SGML") such as, for example, extensible markup language ("XML"). These languages enable codes to be executed from within the signature ready document. Using SGML type languages to prepare signature ready documents enhances the functionality of the documents. Digitized signatures of signers can be appended at locations within a document specified using the language. Specified signing permissions can be associated with particular signing lines within the document. Additionally, the signature ready document can be signed automatically by clicking on a singing line, without signers having to search for or locate the document service provider web site or to manually transfer files between computers for signing. Users can access and view images of the signature ready documents by accessing the document owner's web site using a web browser running on the user computer 104. The document owner's web site can be located on the document owner server 103. Users can prepare signature ready documents for modification by entering data into selected fields in the image of signature ready documents displayed on user computers 104. The entered data can be referred to as form data. Later, the signature ready document can be modified by retrieving the stored copy of the signature ready document and modifying the retrieved signature ready document using the form data. Alternatively, users can download signature ready documents from the stored location by, for example, accessing the document owners web site. The user can then view and modify the downloaded signature ready document instead of viewing a displayed image of the document and entering form data into the document image.

In a first method, a user signs a document by, for example, selecting or clicking on an icon displayed on the browser which causes a signing request to be transmitted from the user computer 104 to the document service provider via the web. The signing request is received at the document service cluster 102 shown in FIG. 2. In response to the signing request, the document service provider identifies the user and confirms the user is authorized to sign the document in an identification process including engaging the user in a request-response interrogation. The document service provider then retrieves a copy of the signature ready document from a stored location, and makes changes to the document using form data retrieved from the user computer 104. Where a user has downloaded a signature ready document onto user computer 104 from a web site, the document service provider can retrieve a copy of the signature ready document, together with any modifications, directly from the user computer 104. A copy of the signature ready document can automatically be downloaded via the browser onto the user computer when the user requests to view the document. The downloaded copy of the signature ready document can be retrieved at the local computer cluster 102 automatically, by the user clicking on a signing line in the signature ready document. The document service provider then obtains the user's private key from a database maintained by the document service provider, and appends the user's digital signature to the document. Thus, the signature ready document is converted into a signed document. The user's digitized handwritten signature can also be appended to the signed document once the document has been digitally signed to signify to anyone viewing the signed document that the document has been digitally signed.

In an alternative method of signing a document, the document service provider receives at the document service cluster 102 a signing request and signing identification credentials from the user. The document service provider then constructs a user private key by applying an algorithm to a private key portion retrieved from a database maintained by the document service provider and to the signing identification credentials received from the user. The signing identification credentials can include, for example, passwords, personal identification numbers, recognition graphics, and biometric information. The document is then signed using the constructed private key as described above in the first signing method, and the private key is destroyed after signing is complete. In this alternative method, complete user private keys are never stored and they are only temporarily created during the signing process. The absence of stored complete user private keys provides an additional security feature, by storing insufficient information to sign, decrypt or encrypt documents within the document service cluster 102.

A user certificate can also be appended to the signed document to aid signature authentication. A user certificate can be a document signed using a trusted third party's private key that contains the user's public key and information identifying the owner of the public key. In the present invention, the trusted third party can be a representative of the document service provider such as, for example, a registration official or an independent certification authority. The user certificate can be signed by multiple trusted third parties to increase the probability a person viewing the signed document recognizes at least one of the certificate signers as a trusted third party.

The document service provider stores a copy of the signed document as an alias in a user filing cabinet 215. A filing cabinet 215 is a database maintained by the document service provider for each user account containing information pertaining to a particular user. Also, the document service provider stores a copy of the signed document as an alias in a document owner filing cabinet 215. The stored aliases point to a true copy of the signed document which the document service provider stores in document database 214. Storing signature ready and signed documents on the document service cluster 102, for example in the document database 214, is an outsourced storage configuration. Alternatively, a document owner can choose to maintain signed and signature ready documents either as a true copy or an alias in a document safe 105. Storing signature ready and signed documents in the document safe 105 is an insourced configuration.

Users and document owners can control access to the signed and signature ready documents located in their filing cabinets 215 or document safes 105. Users and document owners can grant access to non-users, such as individuals who are not registered with the document service provider, to view and authenticate documents. A non-user can authenticate a signed document by accessing the signed document, and decrypting the attached certificate using the public key of a third party trusted by the non-user. The non-user can then decrypt the digital signature using the user public key obtained from the certificate, and confirm that the obtained document hash matches a hash of the accessed signed document.

The document service provider notifies the document owner and users when documents in the filing cabinets or document safes are accessed for signing or viewing. In this embodiment, the document service provider maintains a notification box for each user and document owner. The document service provider notifies the relevant users and document owners of any access to signed documents or to their filing cabinets by forwarding a notification message to the user's or document owner's drop box. Users and document owners can also control access by members of the public to documents stored in their filing cabinets, and can allow particular members of the public to view and authenticate signed documents.

Signing documents with a user private key on the document service cluster permits a user to sign a document from any user computer 104 that is connected to the web. No specialized software is required on the user computer 104 to manage and sign documents. The user's private key and certificate remain securely on the document service cluster 102 at all times and are not stored on the user computer 104. Further, the user's private key can be constructed on the document service cluster 102 prior to signing and can be destroyed soon after signing, so that the user's complete private key only exists on the document service cluster 102 temporarily.

An example of one application of the present invention is providing a method and system for 401K providers to enable investors to roll over their assets into new accounts, by filling out and signing the relevant rollover authorization documents on the web. The investors are users, as described above. The 401K provider makes an electronic version of the rollover document. This document is a template containing several blank fields for information such as the amount of assets to rollover and the distribution of these assets into new accounts. The document also contains a blank line for the investor's signature. The document is a signature ready document.

The 401K provider places this signature ready document in a document safe provided by the document service or, alternatively, stores the signature ready document in the 401K provider's web server where the document can be available to investors. The document safe provides secure storage for both signature ready and signed documents. The document safe connects to the 401K provider's web server, so the 401K provider's investors can browse the signature ready rollover document at the company's web site.

When an investor wants to perform a rollover, the investor browses the rollover document at the 401K provider's web site using a browser running on the investor's computer, fills in the appropriate fields, and clicks on the signing line. The signing line can contain, for example, an embedded URL. This action causes a signing request to be sent to the document service provider server along a secure internet connection. This request results in a response that identifies the investor as an authorized user by prompting the user to enter signing identification credentials. When the document service provider has identified the user and has determined that the user is authorized to sign the document, the document service provider retrieves the signature ready document along with whatever data they entered into the signature ready document.

The document service provider can retrieve the completed signature ready document automatically from the browser running on the investor's computer in response to the singing request, if the investor has downloaded the signature ready document onto his or her computer. The retrieving can be effected merely by the user clicking on a signing line within the document. Alternatively, the document service provider can retrieve a copy of the uncompleted signature ready document from the 401K provider's document safe or web server, can retrieve form data from the investor, and can combine the form data with the uncompleted signature ready document to produce a completed signature ready document. The document service provider can then sign the completed signature ready document either by retrieving a complete user private key from a document service provider database, or by reconstructing a complete user key using a user private key portion retrieved from a document service provider database and information gathered from the investor.

Once the digital signature is created and attached to the document, copies are placed in both the signer's and the company's files. Most documents are stored in filing cabinets within the document service.

A filing cabinet is organized like a Windows or Unix disk directory: it contains a hierarchy of file folders, each of which may hold other items such as signed and signature ready documents. Users view and maintain their filing cabinet using a web browser. Other web users can also potentially view the contents of a filing cabinet, but the owner of the cabinet has full control over who can browse the documents and directories.

If a document owner prefers to store its own documents, it can do so using a document safe 105 or some other persistent storage system such as, for example, a hard disc drive, or an optical disc storage system connected to the document owner server 103. A document safe 105 is essentially a remote filing cabinet, which communicates with the document service via a secure internet connection. The document safe 105 can have a directory structure similar to a server filing cabinet, and the safe's contents can be encrypted for secure storage. The safe 105 can interact with a document owner server 103, which can be a web server, to allow browsing of its contents. The safe can also interact with external event processing programs called third party or client agents. The action of these agents will be described below. All programs interacting with a document safe must present a satisfactory set of credentials before they are allowed access.

When a new signed document is created, all parties involved are notified that the signing occurred. Registered users are given a notification box for receiving notifications of significant events such as document signing. Parties using a document service filing cabinet to receive their copy of a signed document will also receive a signing notification in the notification box. This message confirms that the document was actually signed and contains a link to the document in the user's filing cabinet.

Access to a user's notification box is controlled by a separate set of credentials from those used for signing. If a user's signing credentials are compromised, they can detect fraudulent use when they receive a signing notification for a document that they have not actually signed. For some purposes, a signature should not be considered finalized until the user has received and approved the signing notification. As with other aspects of the service, users receive their notifications using a web browser over a secure Internet connection.

Notification boxes may also be used for other purposes. The boxes can be used to inform users of the progress of follow-up processing on a signed document. The boxes may be used to prompt cosigners to add their signatures, or to remind the next person in a work flow chain to perform some activity on a document.

Producers of signature ready documents can use notification boxes to advertise documents that selected users may want to sign. In our example, the 401K provider can have a contract with the investor's employer to offer retirement accounts throughout the company. If an investing employee leaves his or her job, the employer notifies the 401K provider who then sends a message to the investor's notification box reminding the investor that he or she can roll over funds into another account with the same provider. This message can also contain a hyperlink to the signable rollover form.

To ensure that users receive timely notifications, users can configure their notification boxes to forward notification messages to the users' regular email accounts. These messages can inform users of notifications in their document service notification boxes. Additionally the messages can contain hyperlinks to the notification, but will not include the content of the notifications themselves. This strategy protects private notifications from being sent through insecure standard email channels. Other means of notification may be used such as automated phone calls for urgent messages.

The notification system may also support users sending messages to one another concerning the documents they need to sign, for example to negotiate a document's contents. In this case, the notification service can provide a full, secure email system that guarantees both the privacy and authenticity of all messages.

In addition, the secure email system can be used to send registered mail: the sender can be notified when a user reads a message and the notifications help ensure delivery. These features make it possible to market the email system separately as a premium email service, and use it to draw customers to the document service web site.

If one of the parties in the signing process is using a document safe to store signed documents, no notification needs to be placed in this party's notification box. Instead, the document safe can include an interface that allows third party programs to register and receive a direct notification when a new signed document arrives. A document safe can also be queried by agents for new signed documents.

If the above steps in the signing process are successful, the document service can make the signed document available for viewing. The displayed signed document can contain the signature ready document with all entered changes and form data, and the digitized signature of the signing user on the appropriate signing line. The digitized signature is appended to the digitally signed document to alert viewers that the document has been digitally signed.

If any of the steps taken by the document service during the signing process fails, none of the effects of signing will occur, except that a record of the signing request and its failure will be recorded in the service transaction log. When a signing fails because the user identification process failed, the user can receive notice of the failed attempt to access their signature by, for example, email or phone.

An alternative notification method is to have third party programs send progress notifications to the document signer. In this example, the third party agent could send a notification that the company has received the rollover request and is processing it. Another notification would be sent when processing is complete. If the user does not receive such notifications, they can inquire directly with the 401K company. The company should also have internal procedures to detect the failure of its agents and recover.

In order to help resolve disputes and diagnose various types of problems, a permanent audit trail of all significant events is kept in a service transaction log. The service transaction log can also be referred to as an event log. In this example, the log would include entries for receiving a signing request, creating a new signed document, saving the document in the signer's filing cabinet, sending a signing notification to the signer, sending a copy of the signed document to the 401K provider's document safe, and what type of response was sent back to the user.

The document safe also keeps a transaction log. In this case it would record serving the signature ready document to the user, serving it again to the document service, receiving the signed copy, notifying each registered client agent, and a record for each subsequent request made by an agent make back to the document safe.

As an alternative to an on-site document safe, companies can house their documents, both signature ready and signed, in an electronic filing cabinet hosted by the document service. Such documents can still be browsed seamlessly from the owning company's web site. Such companies can receive a notification in their drop box every time a copy of one of their documents is signed. Any document processing agents they have, human or otherwise, can then query their drop box for new signing notifications.

The Registration Center

FIG. 1 shows the registration center 101. The registration center 101 is a computer system capable of registering entities such as people and corporations as users or document owners with the document service provider. The registration center 101 includes a computer or network appliance connected to the document service cluster either directly, via a dial-up phone connection 106 to the document service cluster 102, or via a network 100. In one embodiment, the registration center connects to the document service cluster via a dial-up connection 106 using secure sockets layer ("SSL") encryption. The SSL encryption increases the tamper resistance of the connection 106 and reduces the threat of tapping.

Figure 11:
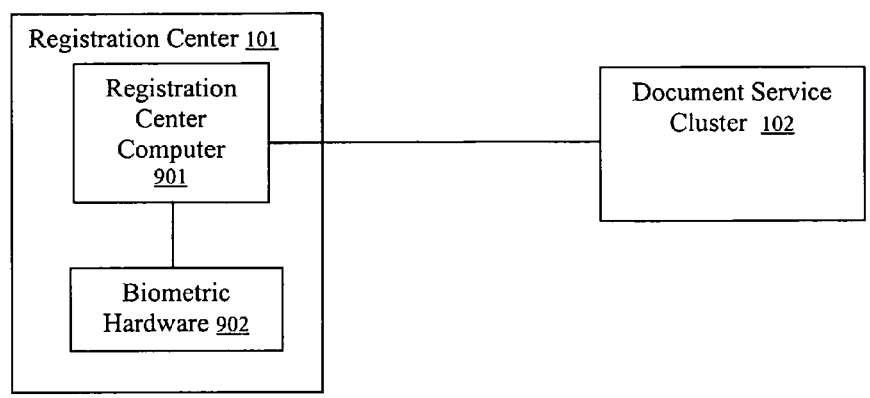
FIG. 11 is a diagram of an embodiment with a registration center connected to a document service cluster.

FIG. 11 shows an embodiment of the registration center 101 connected to the document service cluster 102. The registration center 101 can also include biometric hardware 902 for taking and recording biometric measurements of persons wishing to register such as, for example, finger imprints, retina scans, and pictures. The biometric hardware 902 is directly connected to a registration center computer 901. Biometric measurements can be encrypted in the biometric hardware prior to transmission to the registration computer for increased security. Alternatively, the measurements can be encrypted in the registration computer prior to transmitting to the document service cluster.

The registration center can be located in a wide range of environments such as in banks, corporate offices, and shopping malls. To prevent tampering, the registration computer 901 and the biometric hardware 902 should be enclosed in tamper-resistant cases.

The invention allows people to register as users with the document service by presenting themselves at a registration center together with identification documents such as a driver's license or a birth certificate. At the registration center, a registration official, such as a notary public, can verify and record each person's documented identification information contained in the identification documents, and can witness the registration process. The registration process can include recording and digitizing each person's signature, and recording biometric data such as, for example, finger prints, retina scans, and photographs. Once the registration official has recorded the identifying information, the official can sign an electronic document to acknowledge proper entry of the identifying information. The person registering receives service credentials and signs a service agreement to become a document service user and to establish a user's service account. The service credentials can include access codes such as, for example, passwords, codes, graphics, and other evidence of authorization that permit the user to access the user's service account from a user computer 104. Portions of the service credentials can be used for accessing special system features. Service credentials can include signing identification credentials which can be, for example, passwords, codes, and graphics used for signing documents. Preferably, each person only registers with the document service under one identity. The identifying information recorded during the registration process can be stored in a database and can be checked against the database records for other users having similar biometric data or similar identification documents. Database checking can be used, for example, to detect people attempting register as users under multiple identities by preventing multiple registration of the same or similar biometric data and identification documents. Each user's documented identification information, biometric data, service credentials, digitized initials, and digitized signature can be stored in the database and associated with the user's cryptographic keys and a certificate to establish a service identity. A user's service identity provides authenticated evidence identifying the user as a signatory of an electronic document.

The registration center 101 forwards the user's registration information, including the user's service identity, to the document service cluster 102 via a secure connection 106, or via an encrypted connection along network 100.

Document Service Cluster

Figure 2:
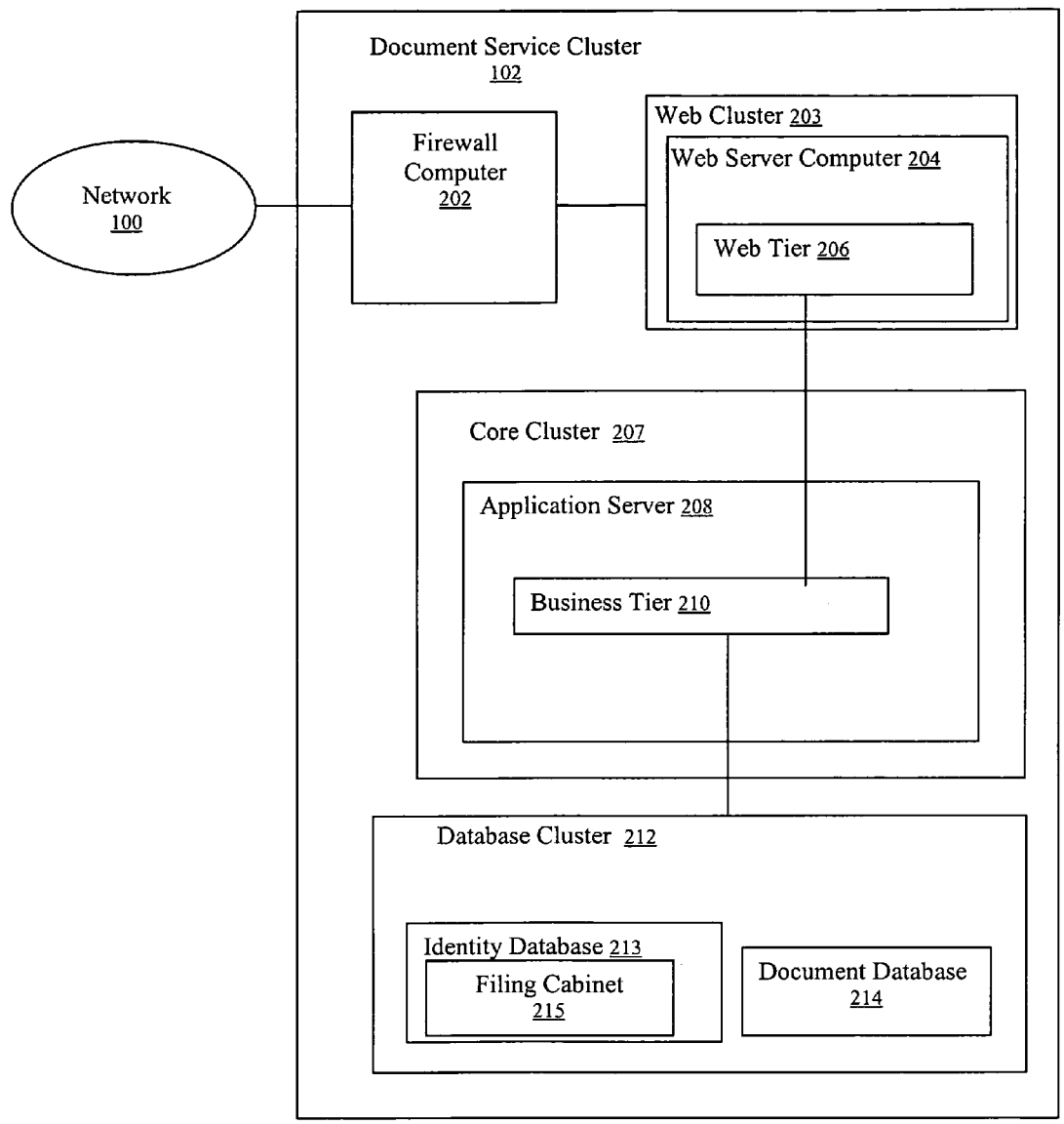
FIG. 2 is a diagram of an embodiment of a document service cluster of the present invention connected to a network.

The document service cluster 102 comprises at least one computer. However, the document service cluster 102 configuration and architecture can vary depending on the demands of a particular application. FIG. 2 shows one embodiment of the document service cluster 102 comprising a cluster of several computers connected to a network 100. The document service cluster 102 includes a firewall computer 202, a web cluster 203, a core cluster 207 which can include a cryptographic subsystem, a logging and notification subsystem, a document subsystem, an administration subsystem, a billing subsystem, and a database cluster 212. The web server cluster 203 comprises a web server computer 204, and the core cluster 207 comprises an application server 208 and associated data storage and support devices.

The document service cluster 102 is a server system that can communicate with remote client computers, including network appliances such as, for example, user computers 104, that are connected to network 100 via the firewall computer 202. Optionally, the document service cluster 102 can communicate with remote client computers such as the registration center computer 901 and the document safe 105 over direct dial-up connections 106 and 107. Communication with remote computers via dial-up connections 106, 107 can bypass the firewall computer 202. Direct dial-up connections and network connections routed through the firewall are routed to the web cluster 203 and to the core cluster. To enhance signing and authentication security, the document service cluster 102 architecture minimizes the amount of processing on remote client computers such as user computers 104 while maximizing processing in the document service cluster 102.

A collection of databases is located on the database cluster 212, and includes an identity database 213, a document database 214, and a filing cabinet within the identity database 213.

The web cluster 203 interfaces between remote client computers via the firewall computer 202 and the core cluster 207. The core cluster 207 interfaces between the web cluster 203 and the database computer 212. The web server computer 204 runs a suite of programs referred to as a web tier 206. The web tier 206 receives requests and responses from browsers running on the user computers 104 and passes these requests on to programs that provide core system functions. The web tier 206 also receives output from the core system programs and transmits this output to user computers 104 in a form that can be displayed by user computer browsers. The web tier 206 can consist of a set of Java Server Pages ("JSPs") and Java Beans.

The web tier 206 operates according to a request-response pattern. A browser running on a user computer 104 sends a primary user request such as, for example, an HTTP request to the web server computer 204. The web tier 206 receives the primary request and responds with some data for display in the browser. In some cases, the web tier 206 can generate a response on its own, but in most cases the web tier 206 forwards a secondary request to core system programs. In general, the web tier 206 response to the primary request depends on the primary request content, the web tier state, and the response from core system programs.

The core system programs are a suite of programs that form the business tier 210. The business tier 210 runs on the application server 208 within the core cluster 207. The business tier 210 performs functions including data storage, database management, database access control, document signing, and document authentication.

A series of requests and responses form a conversation. Conversations involving the web tier 206 and business tier 210 follow fixed patterns called protocols.

Web tier protocols define the interaction between the system and remote computers. Top level protocols define the main features of the system such as, for example, viewing, signing, authenticating. Subprotocols describe common functions that can be used for implementing more than one main feature.

Business tier protocols are divided into two types. Entry point protocols include business tier functions that are invoked from the web tier 206. Core processing protocols include business tier functions that are invoked from other business tier services.

Web tier protocols can be invoked by a client, such as a browser running on a remote computer and operate in the context of a session. A session is a temporary program that is created and remains active while relevant protocols have been invoked and are active. The client invokes a protocol by sending a request to the web tier 206 related to the protocol. If no session exists for the client, one will be created when the first request is received. If sufficient time elapses between receiving requests the web tier 206 can end the session, and a session timeout error can be raised in the current state of the protocol. Variables can be associated with a session. For example the variable "session.user" can be set to a user identity. The "session.user" variable can be set to null until the user attempting to access the document service cluster 102 has been identified.

A web tier state corresponds to a web page that is sent to a client on a remote user computer 104. The web tier 206 is in a neutral state with respect to a client when no session has been created for that client. A neutral web state can be, for example, a login page or a main menu page that the client displays when a person initially accesses the document service system. If the web tier 206 is in a neutral state when a client request is received, the web tier 206 creates a session and invokes relevant protocols. A request can be encoded in a URL. If a top level protocol completes successfully, the web tier 206 returns to a neutral state. If the protocol fails or is cancelled, an abort message is sent back to the client and the web tier 206 subsequently returns to a neutral state.

Figure 3:
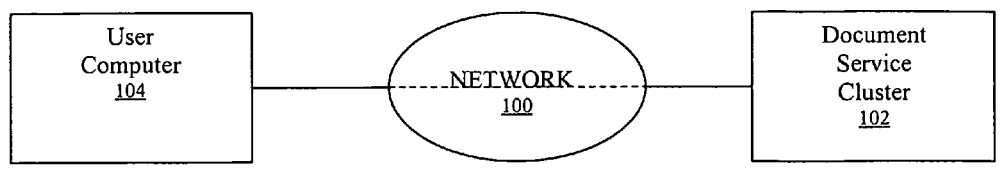
FIG. 3 is a diagram showing the connection between a user computer and a document service cluster in an outsourced configuration of the present invention.

At least two configurations are envisaged for the signing and authentication system of the present invention. In an outsourced configuration, shown in FIG. 3, the document service provider maintains all signature ready and signed documents on databases in the document service cluster 102. An individual can access signature ready documents and signed documents via user computer 104 by initially accessing the document owner's web site located on the document owner server 103. When the individual requests access to a signature ready or signed document, the owner server 103 routes the individual to the document service cluster. Subsequent document services are provided by direct interaction between the user computer 104 and the document service cluster 102.

Figure 4:
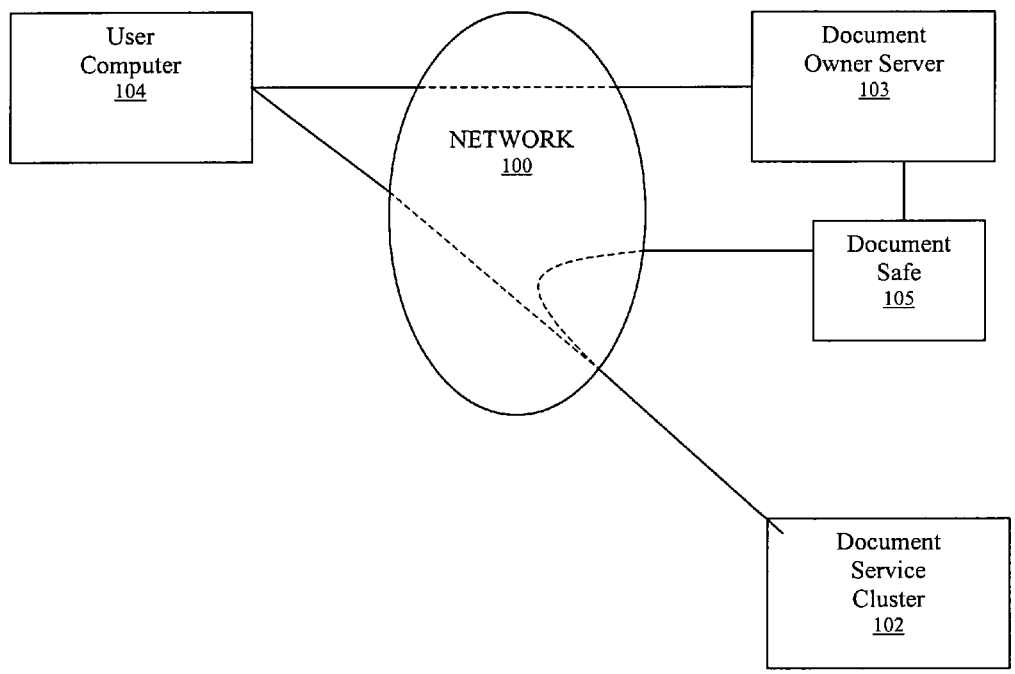
FIG. 4 is a diagram showing connections between a user computer, a document owner server, a document safe, and a document service cluster in an insourced configuration of the present invention.

In an insourced configuration, shown in FIG. 4, the document service provider provides the document owner with a document safe 105. The document safe 105 can include hardware and software necessary for the document owner to maintain a secure database for storing signature ready and signed documents. The document safe 105 can be part of the document owner server 103, or can be set up as a separate server connected to the document owner server 103, as shown in FIG. 4. The document safe 105 can also be connected to the document service cluster 102 via a secure internet connection or via a direct dial-up connection with SSL encryption. Alternatively, the document owner can store the signature ready documents with the other documents served to the web on its web site. An individual accessing signature ready or signed documents first accesses the document owner's web site. The document owner server 103 can permit the user to view and authenticate documents stored in the document safe 105 provided the individual establishes necessary authorizations. If the individual wishes to sign a document and the individual is identified as an authorized user, the individual can amend the viewed version of the document by editing data in data fields displayed on the individual's browser. When the individual initiates a signing request, the request is forwarded to the document service cluster 102. The document service cluster 102 retrieves a copy of the signature ready document stored in the document safe 105, as well as data the individual entered into the data fields. Alternatively, the document service cluster can retrieve a copy of the signature ready document directly from the individual's computer by, for example, pulling the document from the browser that initiated the signing request. The retrieval can be automatic without the individual directing the document service provider to the location of the signature ready document prior to retrieval. The document service cluster 102 amends the signature ready document using the data in the data fields and signs the signature ready document. The signed document is then stored in the document safe 105, and notifications are sent to the document owner and the individual or user.

Figure 5:
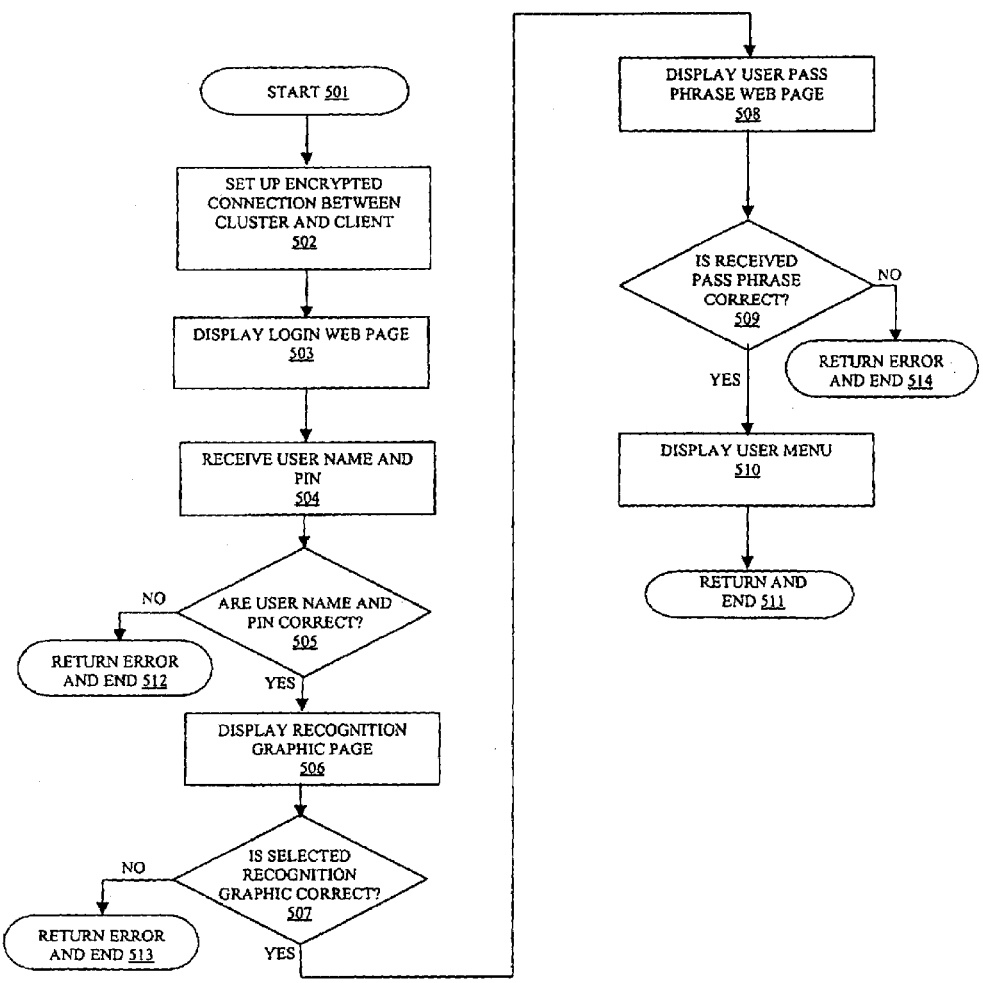
FIG. 5 is a diagram of a web tier identification subprotocol of the present invention.

FIG. 5 shows steps in an identification subprotocol in the web tier 206. The subprotocol is invoked by a top level web tier protocol and identifies individuals attempting to access restricted documents stored on the document service cluster 102 or the document safe 105. This subprotocol performs series of query-response interrogations requiring the individual to enter identifying information such as, for example, a valid user name, personal identification number ("PIN"), and a pass phrase, and also to select a graphic by pointing and selecting a displayed graphic using a mouse. The protocol starts in step 501 when the protocol is called from a top level web tier protocol. In step 502, the protocol sets up an encrypted communication with the client running on the individual's user computer 104. Once a secure connection is established with the client, the protocol causes a login web page to be transmitted to the client 503. The individual enters relevant identifying information such as a user name and a PIN on the login page. The protocol receives the identifying information 504, and invokes a validation business tier protocol to check whether the entered information is correct 505. For example, the invoked protocol can search the identity database 213 for a matching registered user name and PIN pair. If the user name and PIN are not valid, the protocol returns an error to the invoking top level web tier protocol and ends 512. If the user name and PIN are valid, a set of recognition graphics is displayed 506 and the individual selects only recognized graphics included the individual's signing credentials using a non-keyboard selecting device, such as, for example, a mouse or a touch-sensitive screen. The user selects a graphic assigned to them at registration from the presentation set along with another code, such as a pass phrase, that they have previously chosen. Requiring the individual to select a recognized graphic in this way provides a security feature that helps to secure the document service cluster and protect authorized users from hackers. For example, the security feature provides protection against software that hackers can plant on user computers 104 to record a user's keystrokes and thus permit the hackers to discover a user's typed pass codes. After receiving the selected graphics the protocol calls another validation business tier protocol to check whether the graphics were correctly selected 507. If the graphic was correctly chosen, the protocol displays a user pass phrase web page requesting the individual to select a pass phrase 508. Again, the protocol can invoke a validation business tier protocol to check whether the entered pass phrase is correct 509. Recognition graphic display and selection steps 506, 507, and pass phrase display and selection steps 508, 509 can optionally be combined into a single graphic and pass phrase display step and a single graphic and pass phrase selection step. Also, the validation protocol can be incorporated into the identification protocol. If the recognition graphic and pass phrase are correct, the individual has successfully been identified as a registered user. A web page can be displayed to indicate a successful user login and to provide, for example, a menu of further options available to the user 510. Alternatively the protocol can return a successful login flag to the invoking top level protocol.

Figure 6:
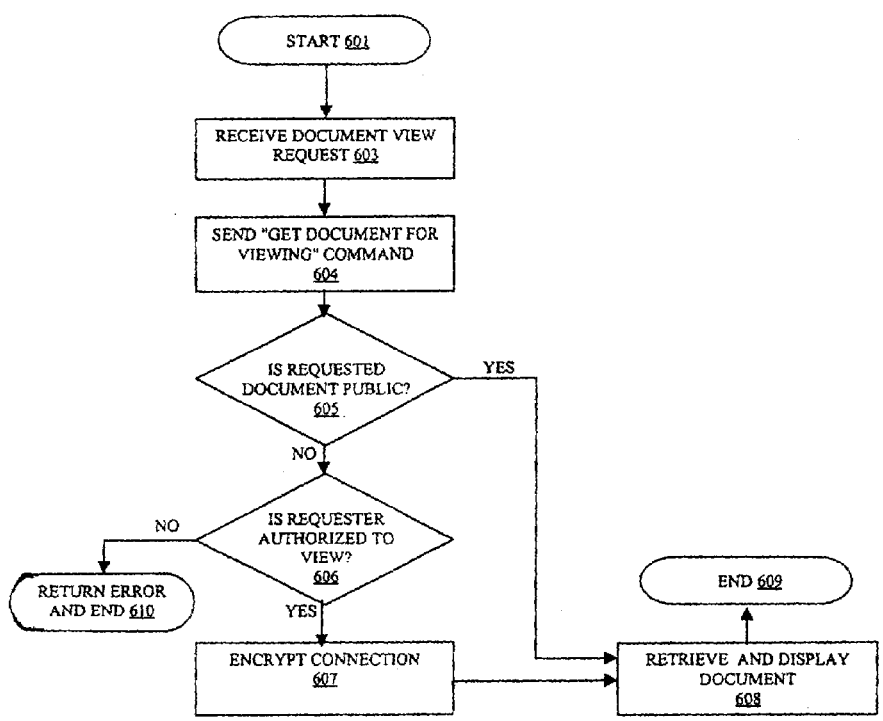
FIG. 6 is a diagram of a web tier document viewing top level protocol of the present invention.

FIG. 6 shows steps in a document viewing top level web tier protocol. The protocol starts in step 601 by an individual sending a request to view a document. The request is transmitted by the client running on the individual's user computer 104 and is received by the web tier 206 running on the web server 204. The request is received in protocol step 603. In step 604, the document viewing top level protocol invokes a document viewing entry point protocol, which is a business tier protocol, by sending a "get document for viewing" command. An example document viewing entry point protocol is shown in FIG. 9. The document viewing top level protocol next determines whether the requested document is publicly available 605 by checking flags returned by authorizations protocol shown in FIG. 8. The authorizations protocol can be called by the document viewing entry point protocol. If the requested document is public, the document is retrieved and displayed 607. If the requested document is not public, the document viewing top level protocol determines whether the individual requesting the document is a registered user with sufficient authority to view the requested document in step 606. Again, this can be achieved by checking which flags have been returned by the authorizations protocol shown in FIG. 8. If the individual is not authorized to view the requested document, the protocol displays an error message and ends 610. If the individual is authorized to view the document, the protocol sets up an encrypted connection with the client in step 607, and displays the requested document in step 608.

FIG. 9 shows steps in a document viewing entry point protocol. The protocol is part of the business tier 210. The protocol starts in step 901. In step 902 a "get document for viewing" command is received from the invoking document viewing top level protocol discussed above, invoking this entry point protocol. In step 903, the protocol determines whether the individual requesting to view the document is authorized by invoking the authorizations protocol shown in FIG. 8. In invoking the authorizations protocol, the viewing entry point protocol forwards information including a document identifier, the user name, and that the action requested is viewing. If the requesting individual is not authorized to view the document, an error flag is returned to the invoking protocol, and the document viewing entry point protocol ends. If the requesting individual is authorized to view the document, a core processing protocol can be invoked in step 904 to locate and retrieve the document from the document database 214. Also, the document viewing entry point protocol returns the retrieved document to the document viewing top level protocol in step 904. Then notifications are sent to the document signers and to the document owner to indicate when and by whom the document was viewed 905. A event log is also recorded 906, and the protocol ends in step 907.

The system of the present invention is made secure by encrypting data stored on databases, and by restricting access to selected features of the system to those who have authority. Event logs, user notifications, and document owner notification provide important additional security features in the present invention. The notifications are automatic and immediate, allowing users and owners to detect unexpected or spurious activity that may be security-threatening. Event logs can help in resolving disputed signing event, further limiting repudiation of signed documents by document signers.

Figure 8:
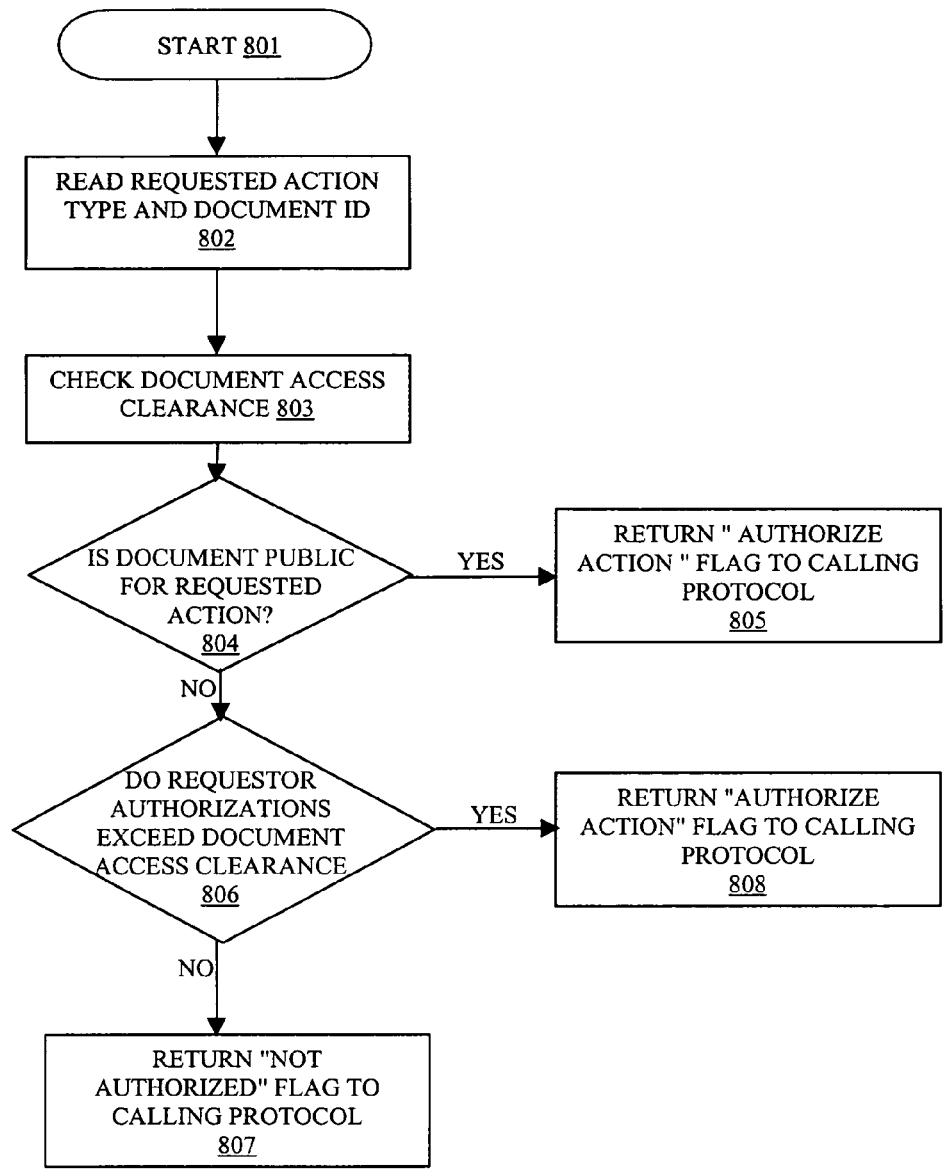
FIG. 8 is a diagram of a business tier authorization core processing protocol of the present invention.
Figure 9:
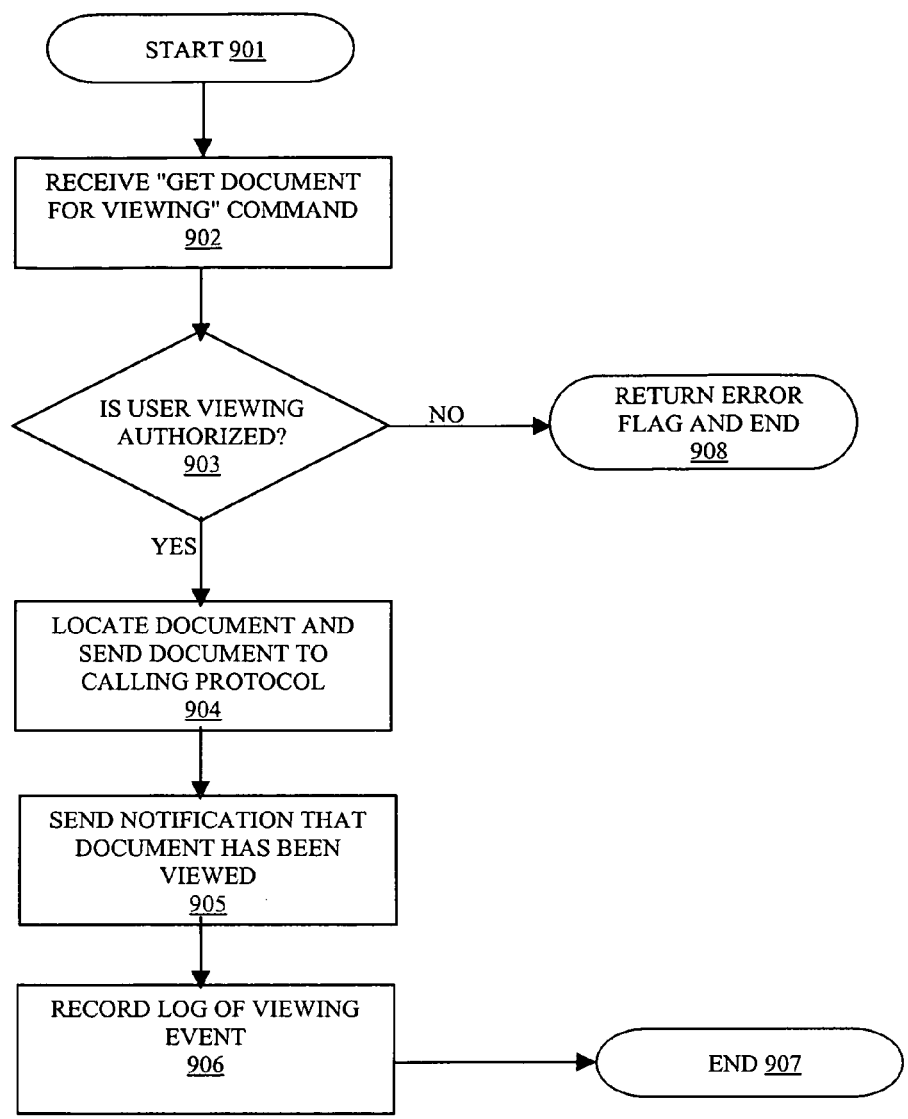
FIG. 9 is a diagram of a business tier viewing entry point protocol of the present invention.

FIG. 8 shows steps in an authorization protocol. The authorization protocol is a core processing protocol in the business tier 210. The authorization protocol starts at stem 801 when the authorization protocol is invoked by a web tier protocol or by an entry point protocol in the business tier 210. In step 802, the authorization protocol determines the type of action for which authorization is requested, and the document identification ("ID") of the document on which the action is to be carried out. Then in step 803, the protocol checks what authorization level is required to carry out the specified action on the document. This information can be stored, for example, with the document in the document database 214, the document safe 105, or in the filing cabinets 215 of document owner and the document signers. Based on this information, the protocol determines if the document is available to the public for performing the requested action 804. The action can be, for example viewing or signing. If the document is public, the protocol returns an action authorized flag and ends 805. If the document is not available to the public, the protocol continues to step 806 where the protocol determines whether the individual requesting the action is identified as a user with appropriate authorization to carry out the action on the requested document. If the requester has sufficient authorization, the protocol returns an "authorize action" flag to the invoking protocol and ends 807. If the requester does not have sufficient authorization a "not authorized" flag can be returned to the invoking protocol and ends 808.

Figure 7:
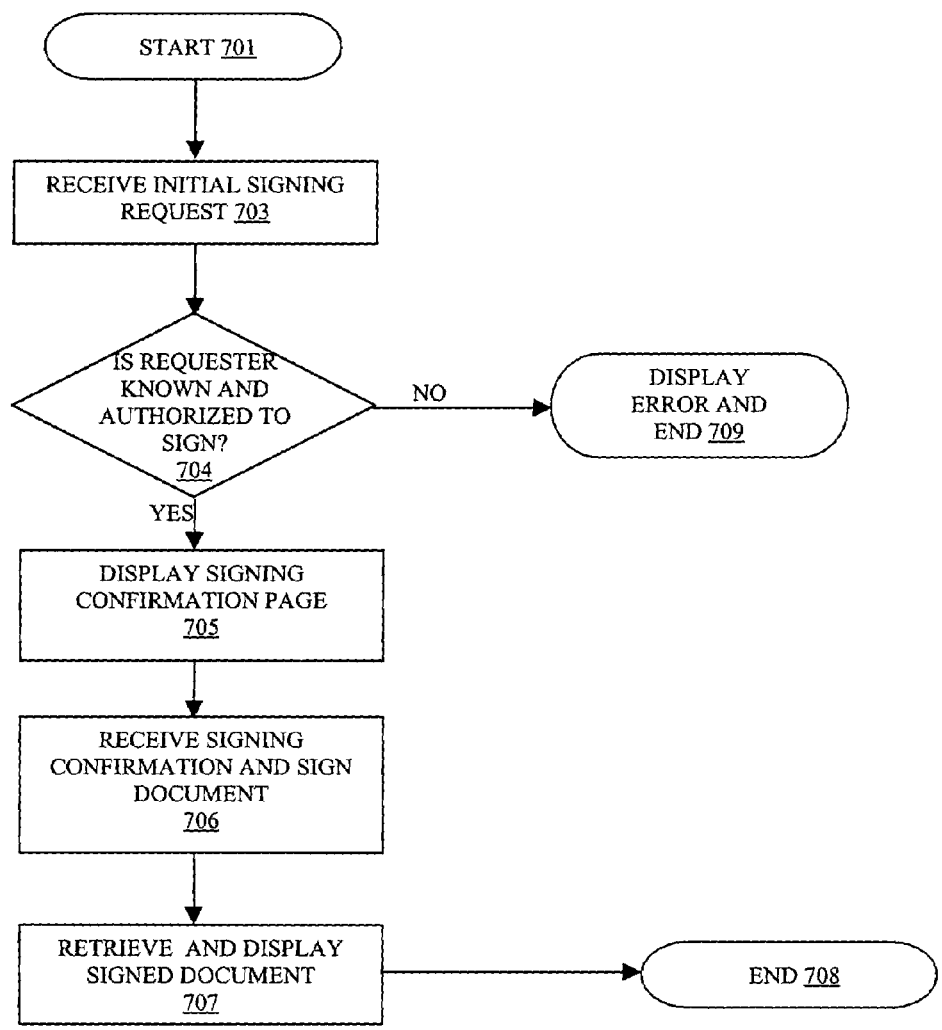
FIG. 7 is a diagram of a web tier document signing top level protocol of the present invention.

FIG. 7 shows steps in a document signing top level web tier protocol. The protocol starts at step 701. An individual who has been identified as a registered user and who is viewing a signature ready document transmits an initial signing request to the web tier 206 via a client running on user computer 104. Alternatively, the individual may have retrieved the signature ready document from a location not secured by the document service provider or the document owner and transmits an initial signing request without having first been identified as a registered user. The initial signing request, which includes the signature ready document identification, form data for amending the signature ready document, and the location in the document where the digitized signature is to be appended is received in step 703. Also in this step, the protocol sets up a secure connection with the client, for example, by using SSL encryption. In step 704, the protocol determines whether the individual is a user and is authorized to sign the signature ready document at the location indicated in the signing request by, for example, invoking the authorization protocol discussed above and shown in FIG. 8. If the user is not authorized to sign at the indicated location in the document, an error message can be displayed and the protocol ends 709. If the user is authorized to sign the document, the protocol displays a signing protocol confirmation page 705. The user can choose either to abort the signing process, or to continue and sign the document. If the user chooses to continue, the signing protocol receives a signing confirmation and invokes an entry point or a core processing signing protocol to sign the document in step 706. Once the document has been signed, the signing protocol locates and displays the signed document on the client 707, and the protocol ends 708.

Figure 10:
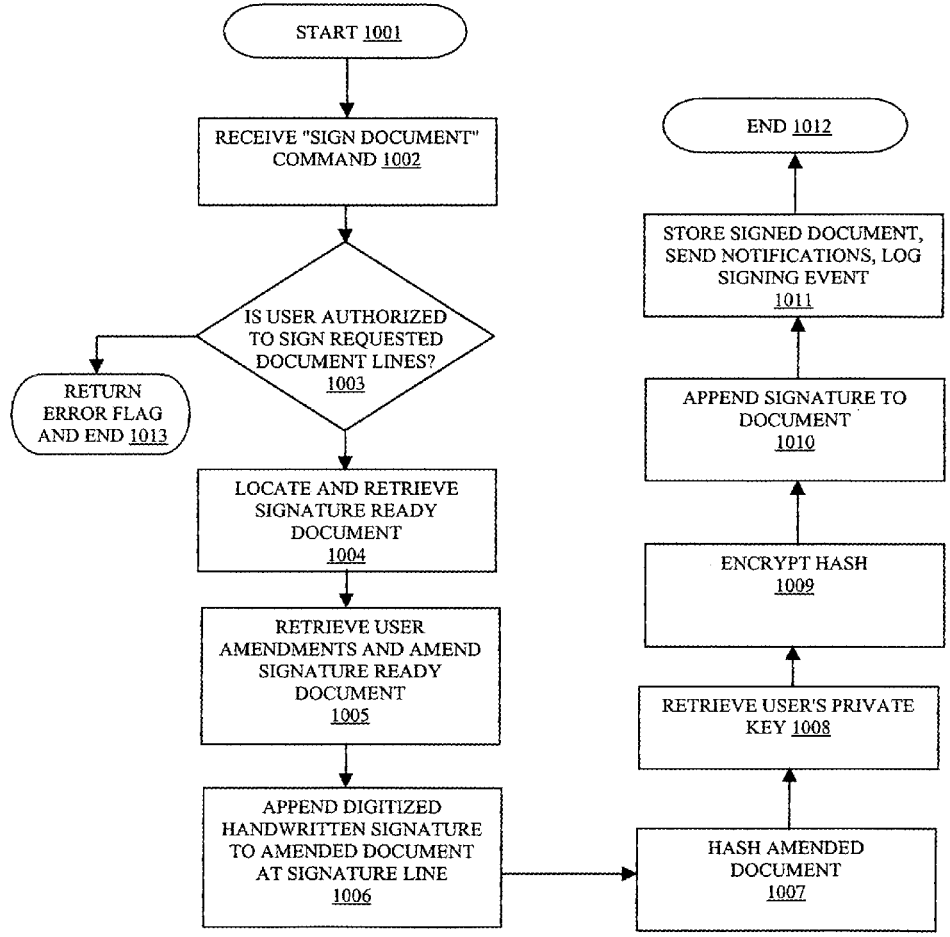
FIG. 10 is a diagram of a business tier signing core process protocol of the present invention.

FIG. 10 shows steps in a signing core process protocol. The protocol starts at step 1001 and receives a "sign document" command from the invoking top level web tier protocol in step 1002. The command can include the signature ready document identification, the location in the document where a digitized signature is to be appended, and any form data that is to be used to amend the signature ready document. Next, the protocol confirms whether the user has authority to sign the document at the desired location in step 1003. If the user is not authorized, the protocol returns an error flag and ends 1013. If the user is authorized to sign the document at the specified location, the protocol locates and retrieves the signature ready document 1004. If necessary, the protocol then amends the signature ready document using the received form data 1005. The user's digitized handwritten signature can then be appended to the document at the specified location 1006. The finally amended document can be hashed 1007. The protocol then locates and retrieves the user's private key 1008, and encrypts the hash with the private key 1009. The encrypted hash is the digital signature which can then be attached to the finally amended document 1010. Finally, the signed document is stored in the document database 214, or in the document safe, notifications are sent to the user and to the document owner, and a log of the signing event is recorded. The protocol ends at step 1012.

While particular embodiments of the present invention have been illustrated and described herein, the present invention is not limited to such illustrations and descriptions. It is apparent that changes and modifications may be incorporated and embodied as part of the present invention within the scope of the following claims.

What is claimed is:

1. In a computer environment that includes a document service cluster having a private key database, the document service cluster having secure access to a database of signature ready documents, the computer environment further including a plurality of remote computers coupled to the document service cluster over a computer network, a method for issuing requests from the remote computers to the document service cluster for signing electronic documents, and signing electronic documents using the document service cluster, the method comprising:

registering each of a plurality of users using a registration process associated with the document service cluster, wherein the registration process includes:
providing, by each user, identifying information corresponding to an identity of the user;
performing a database check of the identifying information provided by each user by comparing the identifying information provided by each user against database records; and
providing a user with service credentials for accessing the document service cluster if an outcome of the database check for the user is successful, whereby the user becomes a registered user;

securely storing a plurality of private key portions associated with the plurality of registered users in the private key database on the document service cluster;

receiving at the document service cluster a signing request and service credentials transmitted from a remote computer by a first registered user, said signing request generated in the absence of a pre-installed add-in software program configured to providing a signed message at the remote computer; wherein the service credentials received from the first registered user are independent of the remote computer used to transmit the signing request to the document service cluster;

using the service credentials received at the document service cluster to identify the signing request as one transmitted by the first registered user, and identifying, at the document service cluster, a signature ready document, from the database of a signature ready documents, to be signed at the document service cluster in accordance with a private key portion that is associated with the first registered user and stored in the private key database;

retrieving, from the private key database at the document service cluster, the private key portion associated with the first registered user;

generating, at the document service cluster, a complete private key using the retrieved private key portion if the retrieved private key portion is not a complete private key;

retrieving at the document service cluster the signature ready document to be signed; and signing the signature ready document at the document service cluster using the complete private key to produce a signed document;

wherein the private key portion remains on the document service cluster during the signing of the signature ready document, and no storage of the private key portion occurs on the remote computer after the signing of the signature ready document.

2. The method of claim 1 wherein the private key portion is a complete private key.

3. The method of claim 1 wherein generating a complete private key using the retrieved private key portion includes:
receiving the service credentials sent from the first user at the remote computer to the document service cluster after receiving the signing request; and
constructing a complete private key using the private key portion and the received service credentials.

4. The method of claim 1 wherein the received signing request was transmitted from the first remote computer to the document service cluster over the internet.

5. The method of claim 1 wherein the received signing request was transmitted from the first remote computer to the document service cluster over the world wide web using hypertext transport protocol, and wherein the signing request was transmitted using a browser running on the remote computer.

6. The method of claim 5 wherein the retrieving at the document service cluster the signature ready document is automatic.

7. The method of claim 5 wherein the retrieved signature ready document is a standard generalized markup language document.

8. The method of claim 1 further comprising storing the signature ready document in the database of signature ready documents.

9. The method of claim 8 further comprising prior to signing:
receiving data from the first remote computer; and modifying the retrieved signature ready document based on the received form date.

10. The method of claim 8 wherein the database of signature ready documents is located on the document service cluster.

11. The method of claim 8 wherein the database of signature ready documents is located on a secure second remote computer.

12. The method of claim 8 further comprising storing the signed document in a second document database.

13. The method of claim 12 wherein the second database is located on a secure second computer remote computer.

14. The method of claim 12 wherein the second database is located on the document service cluster.

15. The method of claim 12 further comprising associating at least one of the signature ready documents and the signed document with a document owner.

16. The method of claim 15 further comprising notifying at least one of document owner and the first user that a signature ready document or a signed document has been signed.

17. The method of claim 1 wherein said registering includes:
verifying and recoding the identify of individuals registering;
digitizing and recording handwritten signatures of individuals registering;
associating passwords with the recorded digitized handwritten signatures and the recorded identities; and
storing the recorded digitized handwritten signatures, and the recorded identities in an identity database, the identity database being accessible to the document service cluster.

18. The method of claim 17 further comprising:
recording at least one biometric measurement other than a handwritten signature of individuals registering;
associating the at least one biometric measurement of individuals registering with the recorded identities of the individuals registering; and
storing the biometric measurements in the identity database.

19. The method of claim 18 further comprising detecting using the biometric measurements whether individuals previously registered.

20. The method of claim 17 wherein the signing comprises:
  a) appending the first user's digitized handwritten signature to the signature ready document;
  b) making a hash of the signature ready document; and
  c) encrypting the hash of the signature ready document with the first user's private key.

21. The method of claim 17 further comprising:
  associating and storing a secret set of recognition graphics with the passwords in the identity database;
  displaying a plurality of recognition graphics, including recognition graphics from the secret set, on the first remote computer;
  requesting the first user to select graphics including in the secret set using a non-keyboard selecting device attached to the first remote computer;
  receiving a message from the first remote computer identifying the selected graphics;
  authorizing access to the document service cluster if the selected graphics are included in the secret set.

22. The method of claim 17 further comprising:
  generating the private key portions for individuals registering, wherein the private key portions can be used with the service credentials to construct complete private keys;
  associating the generated private key portions with the recorded identities of individuals registering; and
  storing private key portions in a private key database.

* * * * *